US007048258B1

(12) United States Patent
Dromgool et al.

(10) Patent No.: US 7,048,258 B1
(45) Date of Patent: May 23, 2006

(54) APPARATUS FOR MOVING OBJECTS

(76) Inventors: Patrick Charles Dromgool, Level 4, 354 Lambton Quay, Wellington (NZ) 6001; Tony Short, Level 4, 354 Lambton Quay, Wellington (NZ) 6001; Jeffrey Charles Cudby, Level 4, 354 Lambton Quay, Wellington (NZ) 6001; Nigel David Shaw, Level 4, 354 Lambton Quay, Wellington (NZ) 6001

( * ) Notice: Subject to any disclaimer, the term of this patent is extended or adjusted under 35 U.S.C. 154(b) by 0 days.

(21) Appl. No.: 10/512,855

(22) PCT Filed: May 13, 2003

(86) PCT No.: PCT/NZ03/00088

§ 371 (c)(1),
(2), (4) Date: Nov. 12, 2004

(87) PCT Pub. No.: WO03/097511

PCT Pub. Date: Nov. 27, 2003

(30) Foreign Application Priority Data

May 15, 2002 (NZ) ...................................... 518936

(51) Int. Cl.
*B66D 1/00* (2006.01)

(52) U.S. Cl. ...................................................... 254/332

(58) Field of Classification Search ................ 254/323, 254/326, 329, 332, 335
See application file for complete search history.

(56) References Cited

U.S. PATENT DOCUMENTS 3,462,033 A * 8/1969 Pioch ......................... 414/494
3,828,942 A * 8/1974 Young ......................... 414/11
3,954,189 A * 5/1976 Sherritt ......................... 414/11
4,036,466 A * 7/1977 Van Meter ................... 249/18
4,049,238 A * 9/1977 Brown ....................... 254/323
5,127,791 A * 7/1992 Attman ....................... 414/814
5,141,211 A 8/1992 Adams, Jr.
5,765,809 A * 6/1998 Baker et al. ................ 254/335
5,918,861 A * 7/1999 Parker ........................ 254/326
6,050,548 A * 4/2000 Leger ......................... 254/326
6,371,449 B1 * 4/2002 Chamberlain ............... 254/387
2001/0029715 A1 * 10/2001 Bradley et al. ............... 52/344
2003/0006354 A1 * 1/2003 Biles et al. .............. 248/354.1

FOREIGN PATENT DOCUMENTS

FR 2288701 A 6/1976

* cited by examiner

*Primary Examiner*—Emmanuel M Marcelo
(74) *Attorney, Agent, or Firm*—O. M. (Sam) Zaghmout; Bio Intellectual Property Services (Bio IPS) LLC

(57) ABSTRACT

This invention relates to an apparatus (1) for lifting and moving objects (2), the apparatus including a mobile base means, a telescoping post means (6, 7), an object handling cradle and a cradle (50) adjusting means (20, 21), wherein the telescoping post means is attached to the mobile base means and is substantially vertically disposed and being adapted with means to adjust the height of the post means between a retracted position and an extended position, the cradle adjusting means being adapted to be pivotably attached adjacent the top end of the post means in a horinzontal axis to enable the cradle to be adjustable in a vertical plane, the cradle having a substantially planar top surface and being adapted to be rotatably connected to the cradle adjusting means to enable the cradle to be rotatable in a horizontal plane and being adapted to support and transport an object to a desired position.

8 Claims, 5 Drawing Sheets

APPARATUS FOR MOVING OBJECTS

TECHNICAL FIELD

This invention relates to devices and apparatus for moving and lifting objects. More particularly, but not exclusively, the present invention relates to an apparatus for use in moving and lifting panels, doors, sheets of glass and the like for installation or otherwise.

BACKGROUND ART

Some building materials such as, for example, plaster board sheets and other sheets of material, large desk tops and large glass windows are cumbersome to transport to the place and position of installation. In the case of large sheets of plasterboard sheets, more than one person may be required to move such sheets without damage to the sheets and surrounding property. The need to have at least two persons to move large sheets can be an inconvenience, and may cause delays in the transportation of materials to an installation site. Further, even with at least two persons handling such sheets, it can be difficult to position boards and sheets in places for installation purposes. It can also be difficult to transport such boards and sheets into lift wells, small foyers and the like.

It is an object of the invention to provide an apparatus for moving and lifting objects which overcomes at least some of the abovementioned problems, or at least to provide the public with a useful choice.

SUMMARY OF THE INVENTION

According to a broad aspect of the invention there is provided an apparatus for lifting and moving objects, the apparatus including a mobile base means, a telescoping post means, an object handling cradle and a cradle adjusting means, wherein the telescoping post means is attached to the mobile base means and is substantially vertically disposed and being adapted with means to adjust the height of the post means between a retracted position and an extended position, the cradle adjusting means being adapted to be pivotably attached adjacent the top end of the post means in a horizontal axis to enable the cradle to be adjustable in a vertical plane, the cradle having a substantially planar top surface and being adapted to be rotatably connected to the cradle adjusting means to enable the cradle to be rotatable in a horizontal plane and being adapted to support a said object.

Preferably the cradle adjusting means is substantially horizontally pivotably attached to the top end portion of the post means to allow for movement of the cradle in a vertical plane, and wherein a vertical adjustment member and associated vertical brake means are pivotably attached in the same horizontal axis and configured and arranged to allow, in use, the top surface of the cradle to be set in any one of a plurality of positions between a substantially vertical position and a substantially horizontal position.

Desirably the post means includes a telescoped assembly having an upper tubular member sleeved within a lower tubular member, and a winch pulley system operable by a winch and a cable configured and arranged to move the upper tubular member between a retracted position and an extended position.

Advantageously the cradle includes a support frame defining a substantially planar top surface having at least one continuous edge along the outer rim of the support frame.

Preferably the support frame includes at least two tubular beam members adapted to slidably retain retractably extending end arms projecting from within the end portions of the beam members, and having means to set the extendable end arms in a desired extended position.

Preferably the support frame includes at least two tubular cross members adapted to be slidably associated with corresponding outer cross members, the outer cross members being attached to the inside edges of the beam members and being configured and arranged to allow for a plurality of distances between the beam members to be set.

Additionally the support frame further includes clip means provided on a beam member for load securing purposes.

BRIEF DESCRIPTION OF THE DRAWINGS

A preferred embodiment of the invention will now be illustrated, by way of example only, with reference to the accompanying drawings in which.

DETAILED DESCRIPTION OF THE DRAWINGS

Figure 1:
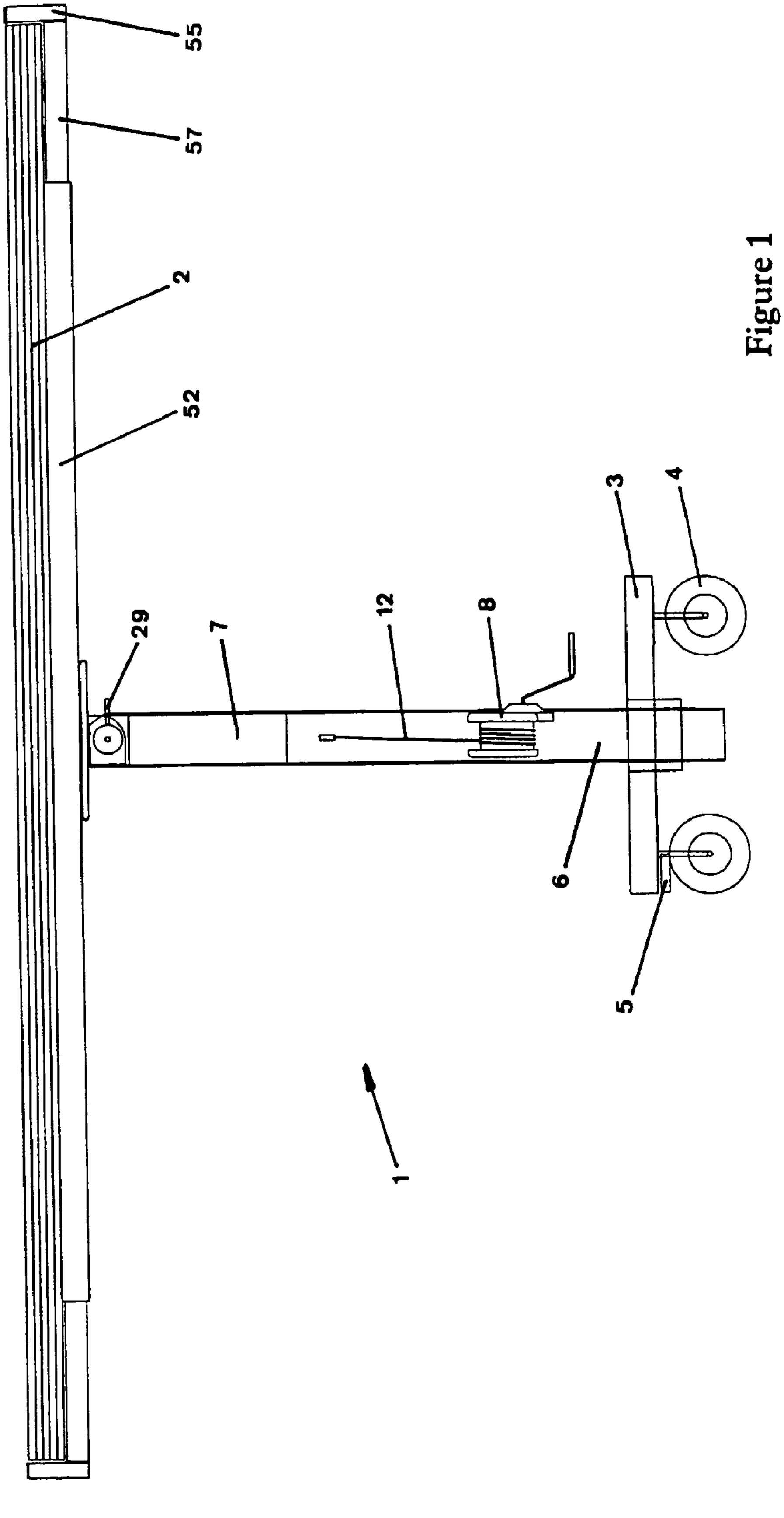
FIG. 1: Shows a side view of the apparatus handling large sheets according to a preferred embodiment of the invention.

Referring to the figures, an apparatus for lifting and moving objects, generally referred to as 1, according to a preferred embodiment of the invention, is illustrated.

The apparatus 1 is configured and arranged to move objects such as, for example, sheets of plasterboard and glass, wide desktops and the like. In this preferred embodiment a stack of wall and ceiling plasterboard sheets 2 are shown by way of example only.

The apparatus 1 includes a mobile base means in the form of a base frame 3 and wheels 4 pivotably mounted to the base 3. The base 3 is adapted to accommodate a plurality of wheels 4, and preferably four wheels 4 are provided in a spaced apart arrangement to provide stability and manoeuvrability of the apparatus 1.

The base 3 and wheels 4 are made of any suitable resilient and durable material. The wheels 4 are preferably made of a high density polyurethane, and desirably comprise non-directional castor wheels. Preferably the base frame means includes a wheel locking means in the form of locking tabs 5. The locking tabs 5 are advantageously provided on at least two of the four wheels 4.

Figure 2:
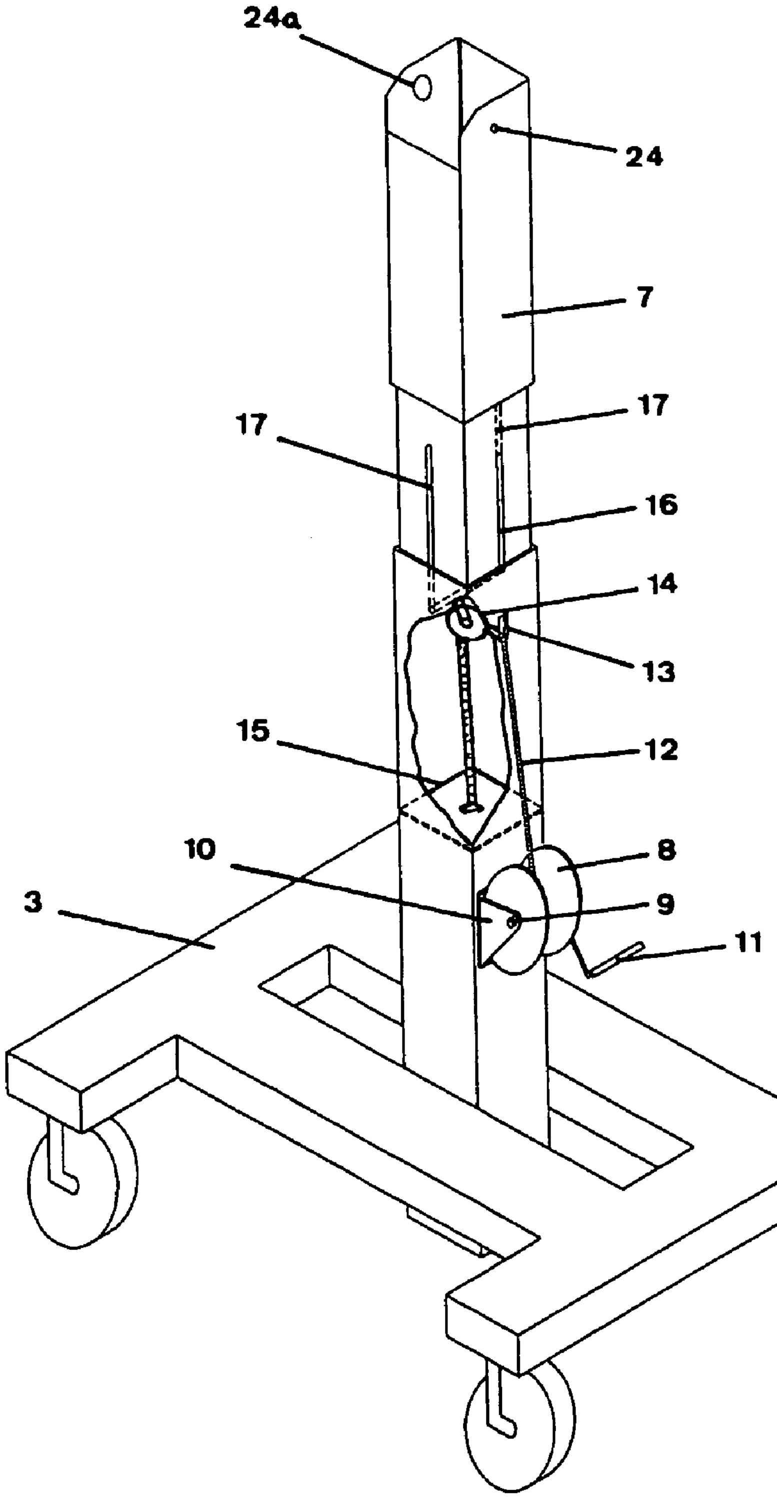
FIG. 2: Shows the telescoped assembly and winch pulley system without the cradle and cradle adjusting means and on an alternative mobile base means.

Referring now also to FIG. 2, showing an alternative base 3, the base 3 is adapted to retain a post means desirably in the form of a telescoped assembly. The telescoped assembly includes a substantially vertical lower post 6 mounted or attached to the base. The vertical post 6 forms a lower tubular member of the assembly and is desirably square in cross section although it will be appreciated that any suitable tubular cross section may be used. An upper tubular member or sleeve 7 is adapted to be sleeved within the lower tubular post 6.

The post means is configured and arranged to be height adjustable at any desirable position between a retracted position and an extended position. As seen more clearly with FIG. 2, a winch pulley system is incorporated with the post means and includes a winch drum 8 mounted to a shaft 9 that is pivotably mounted to a bracket 10. The bracket 10 is attached to the lower post 6. A winch handle 11 is mounted to the drum 8 for leverage purposes. A winch rope or cable 12 is fixed to the shaft 9 and passes through a slot 13 in the post 6 and about a rotatably mounted pulley 14 and is fixed to a base plate 15 at the lower end of the sleeve 7.

A cable slot 16 and pulley axle slots 17 is provided in the sleeve 7 to allow for unimpeded movement of the cable 12 and sleeve 7 between any point between a retracted position and an extended position. The winch drum 8 is adapted with a locking means to set the required height of the sleeve 7. Further, the winch drum 8 is provided with a suitable ratchet system allowing for proper and safe lifting of loads.

Figure 3:
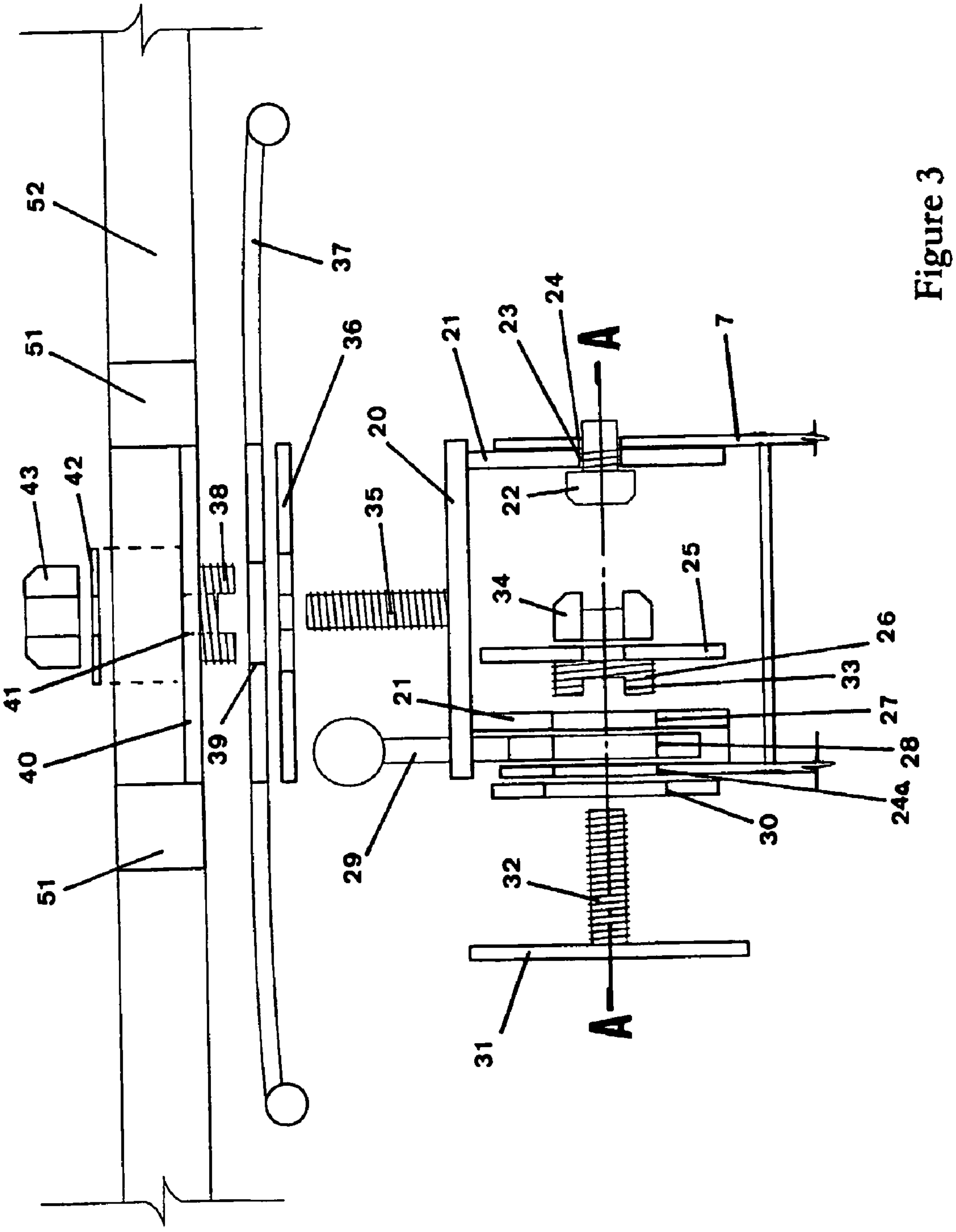
FIG. 3: Shows an exploded detailed view of the cradle adjusting means.
Figure 4:
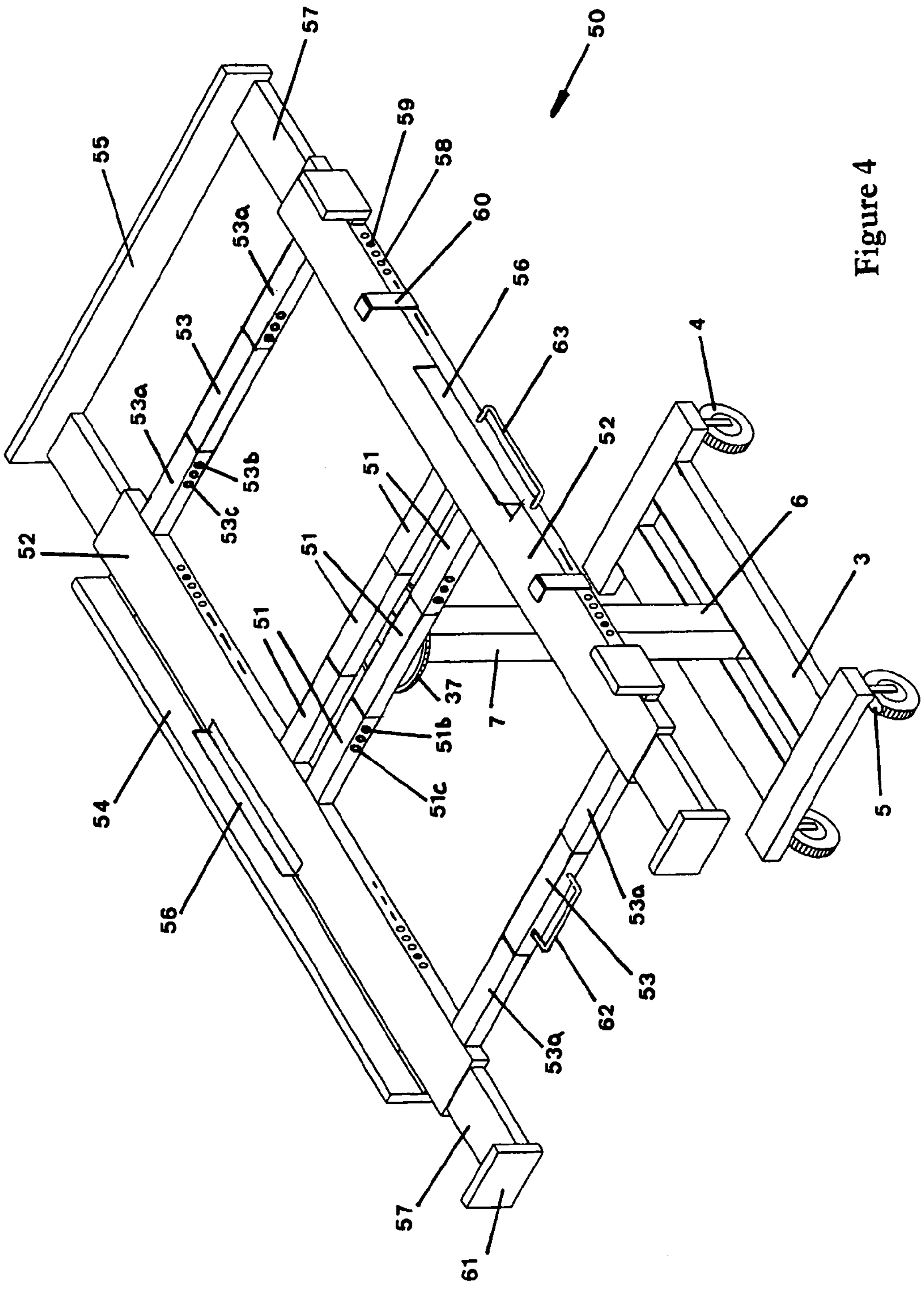
FIG. 4: Shows a perspective view of the apparatus of FIG. 1.

Referring now more particularly to FIGS. 3 and 4, a more detailed view of the cradle adjusting means according to a preferred embodiment of the invention, is illustrated.

The cradle adjusting means includes a plate 20 and support frame 21 being pivotably connected adjacent the top end portion of the post means in the form of the sleeve 7. The pivotable connection is through horizontal axis A—A. At one side of the sleeve 7 a fastening means in the form of a threaded pin 22 is fastened through apertures 23, 24 such that it threads through aperture 23 in the frame 21 and its distal end projects through the aperture 24 in the sleeve 7 to allow for rotational movement of the frame 21 relative to the sleeve 7.

A flange 25 and threaded section 26 is threadedly fastened through aperture 27 and the centre aperture 28 in the lever 29. The lever 29 is therefore mounted onto the threaded section 26 for operable adjustment of the plate 20 as required. A brake means is in the form of a brake disc 30 is mountable on the threaded section 26. The assembly is firmly secured together by way of an outer flange 31 and bolt 32 passing through an aperture 33 in the threaded section 26, and through aperture 24*a* in the sleeve 7 and flange 25 and then received and fastened by way of a locking nut 34.

In operation, it is seen that the lever 29 adjusts the plate 20 to a desired position, and then a user may secure the plate 20 in position by engaging and rotating the lever 29 to a desired position which causes the brake disc 30 to bear against the sleeve 7, thus locking the assembly in a desirable position, as required.

The object handling cradle 50 is rotatably mounted to the plate 20. A preferred attachment assembly is in the form of a threaded bolt 35 attached to, and being integral, with the plate 20. A brake disc 36 is mounted about the bolt 35 and a wheel brake 37 is positioned over the bolt 35 and a central aperture 39 is connected to a threaded bolt 38. The threaded bolt 38 is attached to, and integral with, a cradle block 40. The cradle block 40 is attached between the cross members 51. The bolt 35 passes through a central aperture 41 in the bolt 35 and the cradle block 40 and the cradle mounting assembly is fastened and secured together by a washer 42 and lock nut 43.

In operation, a cradle 50 is provided with rotational movement relative to the post means and the wheel brake and associated brake disc 37 is configured and arranged to rotate and then set the desired position of the cradle 50 in place for handling and movement of objects thereon.

Referring now particularly to FIG. 4, a perspective view of the apparatus 1 showing an object handling cradle, generally referred to as 50, is illustrated.

The object handling cradle 50 is particularly adapted to support and move large, relatively thin, sheets such as plasterboard, glass, laminated boards and panels, and the like. The cradle 50 includes a pair of centrally located cross members 51.

The width of the cradle 50 can therefore be adjusted as required. The cross members 51 are fixed at the central area and have outer portions (not shown) that are configured to be slidably inserted within tubular outer members 51*a*. The outer cross members 51*a* are preferably attached to respective beams 52 and are desirably tubular to allow sleeved central members 51 to be slidably associated with the respective cross members 51. Various extendible widths can be set by way of retractable spring loaded pins 51*b* locatable in any one of a plurality of apertures 51*c* in the side edges of the outer cross members 51*a* respectively.

The cross tie members 53*a* are attached to respective beams 52 on either side of the cross members 51 and are desirably tubular to allow sleeved central members 53 to be slidably associated with the respective cross tie members 53*a*. Various extendible widths can be set by way of retractable spring loaded pins 53*b* locatable in any one of a plurality of apertures 53*c* in the side edges of the outer cross tie members 53*a* respectively. Only one cross tie member 53 may be provided with adjusting means as the other cross tie member 53 will expand and retract relative to the cross members 51 as required. It will be appreciated that when the distance between the beam members 52 is being adjusted beyond the fixed width edge 55, the continuous edge 55 will need to be removed.

It will be appreciated according to alternative embodiments of the invention that the adjustability of the cradle 50 can be made from minor variations in the cradle components. For example, the continuous edge 55 may have a flexible central portion that allows the distance between the beams 52 to be adjusted without removal of the edge 55.

A pair of spaced apart beams 52, preferably tubular in cross-section, are attached to the ends of the cross members 51*a* and spaced apart supporting cross tie members 53. The cross members 51, cross tie members 53 and beams 52 are configured and arranged to form a substantially planar top surface to allow wide and flat objects to be cradled thereupon without damaging such objects.

The cradle 50 further includes a continuous side edge 54 along at least one side of the cradle 50. In this embodiment one continuous side edge is shown, although it is envisaged that it may be provided on opposing side edges in some situations. The continuous edge 54 is seen to be a desirable feature as it allows sheets to be mounted securely on the cradle, and moved in such a way that damage may be minimised to edges of the sheets, particularly if such sheets are plasterboard sheets.

A continuous end edge 55 is provided for ease of loading sheets and boards.

It is envisaged that with some delicate handling operations such as with cradling panes of glass, rubber or polyethylene inserts 56 in the form of strips and/or angle strips may be releasably attachable or simply placed onto the top surface of the cradle to minimise damage to any fragile objects being moved, and to increase friction that can serve to reduce unwanted movement of such fragile objects during manoeuvring and/or installation.

The cradle 50 preferably includes retractably extendable end arms 57 that are sleeved within the end sections of the beams 52. The arms 57 are preferably slidably adjustable relative to the beams 52 to accommodate different sized sheets and objects, as required. Various extendible lengths may be set by desirably having retractable spring loaded pins 58 positioned in a plurality of apertures 59 made along the side edges of the beams 52.

Clips 60 are preferably fitted to the beams 42 to be used to secure the edges of sheets and boards for additional securing purposes. The clips 60 can be any known and suitable type of clamping system, and may be made of any durable and resilient material.

Arm tabs 61 form part of the distal end of the arms 57 located at the opposite end from the continuous edge 55 for sheet supporting purposes.

A handle 62 is provided on the central cross member 53, and a second handle 63 on the beam 52, for allowing a user to move the apparatus 1 and allow a good grip on the cradle 50 for tilting purposes, as required.

Figure 5:
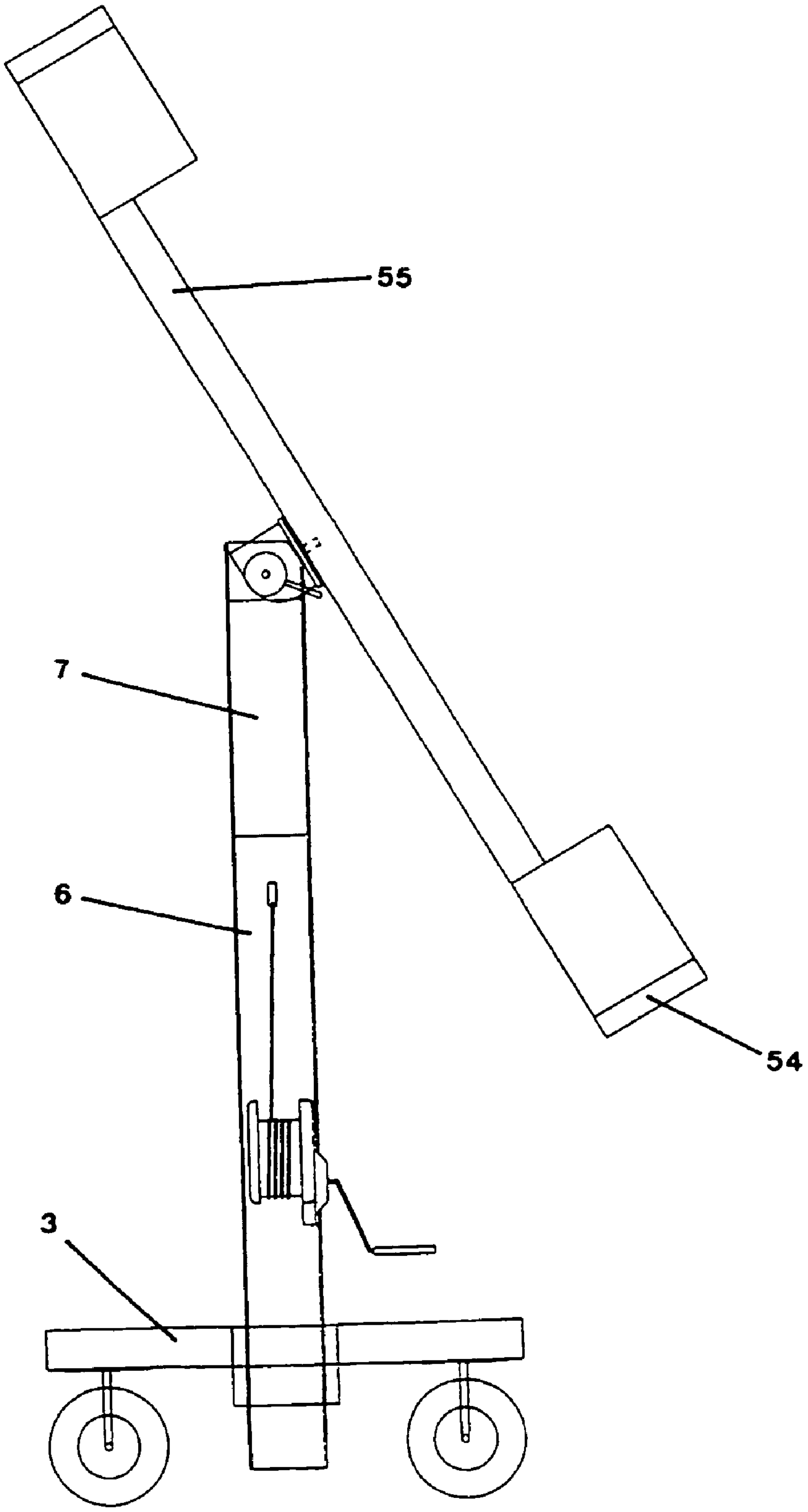
FIG. 5: Shows a side view of the apparatus 1 in a tilted orientation.

Referring now more particularly to FIG. 5, a side view of the 50 in a tilted position, is now further described.

The apparatus 1 is shown with the cradle 50 rotated about 40 degrees from the vertical and being ready for stacking purposes. One non-limiting operation of the apparatus 1 will now be described. Generally the cradle 50 will be rotated about the horizontal axis A—A so that the top surface of the cradle 50 it tilted with the continuous edge 54 at the lower end of the cradle 50. The objects, such as for example plasterboard sheets, are then stacked onto the top surface of the cradle 50 with the lower edge of the sheets resting against the edge 54.

The top edge of the sheets can then be secured by way of the arms 57 being adjusted until arm tabs 61 and edge 55 abut the side edges of the sheets 2. The wheel locks 5 can then be released and the apparatus 1 is moved to the destination area for the objects or sheets. It will be appreciated that movement of the sheets can be achieved by one person rather than usually at least two persons when large bulky sheets are being moved.

The apparatus 1 is designed with a view to making movement of sheets easier, particularly when transporting sheets via elevators. It is envisaged that the apparatus 1 can be configured and arranged to enable the sheets to be stacked at a suitable angle to the cradle 50 and transported. It is envisaged that the components of the apparatus 1 may be easily disassembled and reassembled for ease of transportation and portability when the apparatus 1 is not in use.

The apparatus 1 may be made of any suitable and durable materials and in this preferred embodiment is made substantially of cast mild steel. Other commonly used metals such as aluminium may be used as required. Other materials such as durable plastics materials may be desirably used as required.

Wherein the aforegoing reference has been made to integers or components having known equivalents, then such equivalents are herein incorporated as if individually set forth. Accordingly, it will be appreciated that changes may be made to the above described embodiments of the invention without departing from the principles taught herein.

Additional advantages of the present invention will become apparent for those skilled in the art after considering the principles in particular form as discussed and illustrated. Thus, it will be understood that the invention as described is not intended to be restrictive in any way, and is intended to be illustrative. Many other embodiments will be apparent to those skilled in the art upon reviewing the above description, and therefore the invention is not intended to be limited to the particular embodiments described or illustrated, but is intended to cover all alterations or modifications which are within the scope of the appended claims.

The invention claimed is:

1. An apparatus for lifting and moving objects, the apparatus including a mobile base means, a telescoping post means, an object handling cradle and a cradle adjusting means, wherein the telescoping post means is attached to the mobile base means and is substantially vertically disposed and being adapted with means to adjust the height of the post means between a retracted position and an extended position, the cradle adjusting means being adapted to be pivotably attached adjacent the top end of the post means in a horizontal axis to enable the cradle to be adjustable in a vertical plane, and wherein a vertical adjustment member and associated vertical brake means are pivotably attached in the same horizontal axis and configured and arranged to allow, in use, the top surface of the cradle to be set in any one of a plurality of positions between a substantially vertical position and a substantially horizontal position, and wherein the cradle is adapted with a substantially planar top surface and is adapted to be rotatably connected to the cradle adjusting means to enable the cradle to be rotatable in a horizontal plane and being adapted to support a said object.

2. An apparatus according to claim 1 wherein the post means includes a telescoped assembly having an upper tubular member sleeved within a lower tubular member, and a winch pulley system operable by a winch and a cable configured and arranged to move the upper tubular member between a retracted position and an extended position.

3. An apparatus according to claim 1 wherein the cradle includes a support frame defining a substantially planar top surface having at least one continuous edge along an outer rim of the support frame.

4. An apparatus according to claim 3 wherein the support frame includes at least two tubular beam members adapted to slidably retain retractably extending end arms projecting from within the end portions of the beam members, and having means to set the extendable end arms in a desired extended position.

5. An apparatus according to claim 4 wherein the support frame includes at least two tubular cross members adapted to be slidably associated with corresponding outer cross members, the outer cross members being attached to inside edges of the beam members and being configured and arranged to allow for a plurality of distances between the beam members to be set.

6. An apparatus according to claim 5 wherein the support frame further includes clip means provided on a beam member for load securing purposes.

7. An apparatus according to claim 1 wherein the mobile base means is provided with four spaced apart wheels pivotably attached to a bracket which is itself rotatably associated with the underside of the mobile base means, in use, to swivel in any direction on a floor surface.

8. An apparatus for lifting and moving objects, the apparatus including a mobile base means, a telescoping post means, an object handling cradle and a cradle adjusting means, the cradle adjusting means is substantially horizontally pivotably attached to the top end portion of the post means to allow for movement of the cradle in a vertical plane, and wherein a vertical adjustment member and associated vertical brake means are pivotably attached in the same horizontal axis and configured and arranged to allow, in use, the top surface of the cradle to be set in any one of a plurality of positions between a substantially vertical position and a substantially horizontal position, the telescoping post means being attached to the mobile base means and is substantially vertically disposed and being adapted with means to adjust the height of the post means between a retracted position and an extended position, the cradle adjusting means being adapted to be pivotably attached adjacent the top end of the post means in a horizontal axis to enable the cradle to be adjustable in a vertical plane, the cradle having a substantially planar top surface and being adapted to be pivotably connected to the cradle adjusting means, the post means includes a telescoped assembly having an upper tubular member sleeved within a lower tubular member, and a winch pulley system operable by a winch and a cable configured and arranged to move the upper tubular member between a retracted position and an extended position, the mobile base means having four spaced apart castor wheels attached to the underside of the mobile base means to allow for movement of the apparatus about a floor area.

* * * * *